May 13, 1924.
J. R. HILL
COVER FOR STORAGE TANKS
Filed July 19, 1922
1,493,544
2 Sheets-Sheet 1
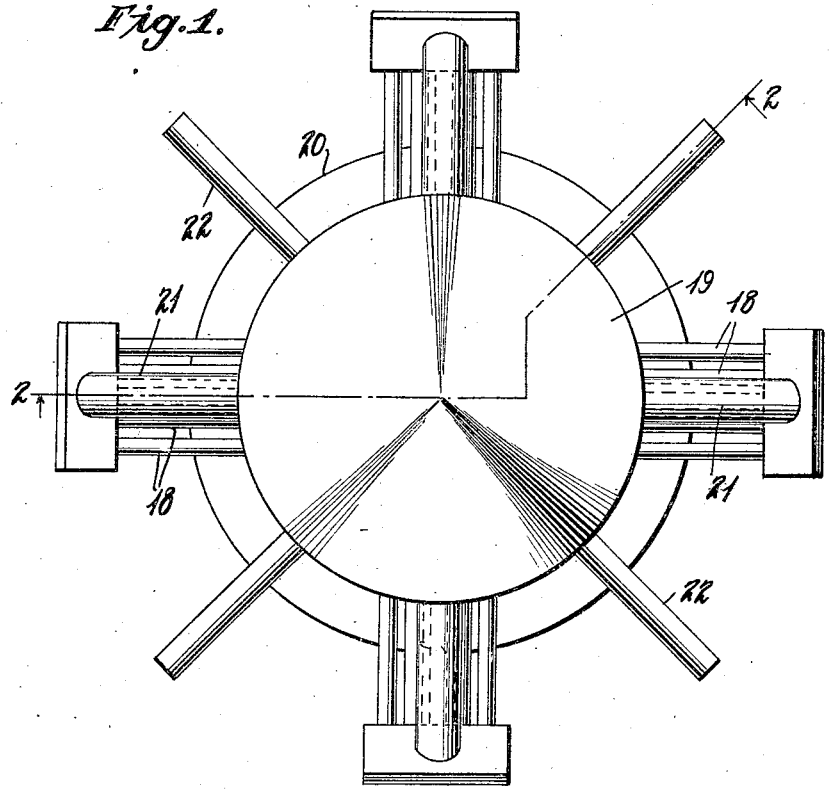
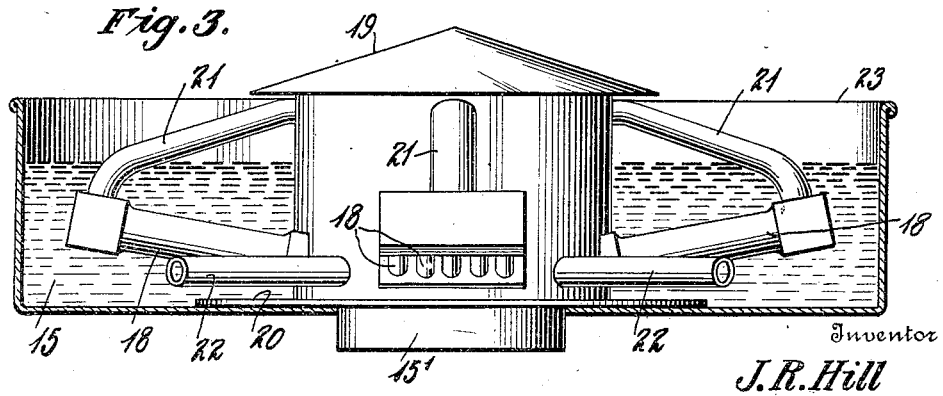
Inventor
J. R. Hill
By
_____ Attorney May 13, 1924.

J. R. HILL

COVER FOR STORAGE TANKS

Filed July 19, 1922

Inventor
J.R.Hill

By

Attorney

Patented May 13, 1924.

1,493,544

UNITED STATES PATENT OFFICE.

JOHN RICHARD HILL, OF TULSA, OKLAHOMA.

COVER FOR STORAGE TANKS.

Application filed July 19, 1922. Serial No. 575,999.

*To all whom it may concern:*

Be it known that I, JOHN RICHARD HILL, a citizen of the United States, residing at Tulsa, in the county of Tulsa and State of Oklahoma, have invented certain new and useful Improvements in Covers for Storage Tanks, of which the following is a specification.

This invention has reference to a cover and condenser to be used on crude oil storage tanks and gasoline reservoir.

The principal object of the invention is to provide means for safeguarding such tanks against the possibility of fire and to provide for retention of gasoline within the tank thru condensation of the exhaust gases therefrom.

With the above and other objects in view the invention resides in the detail of construction and arrangements of parts as hereinafter more fully pointed out and described, reference being had to the accompanying drawings, wherein:

Figure 1 is a top plan view of the proposed device,

Figure 3 is a side elevation of the device.

Figure 2:
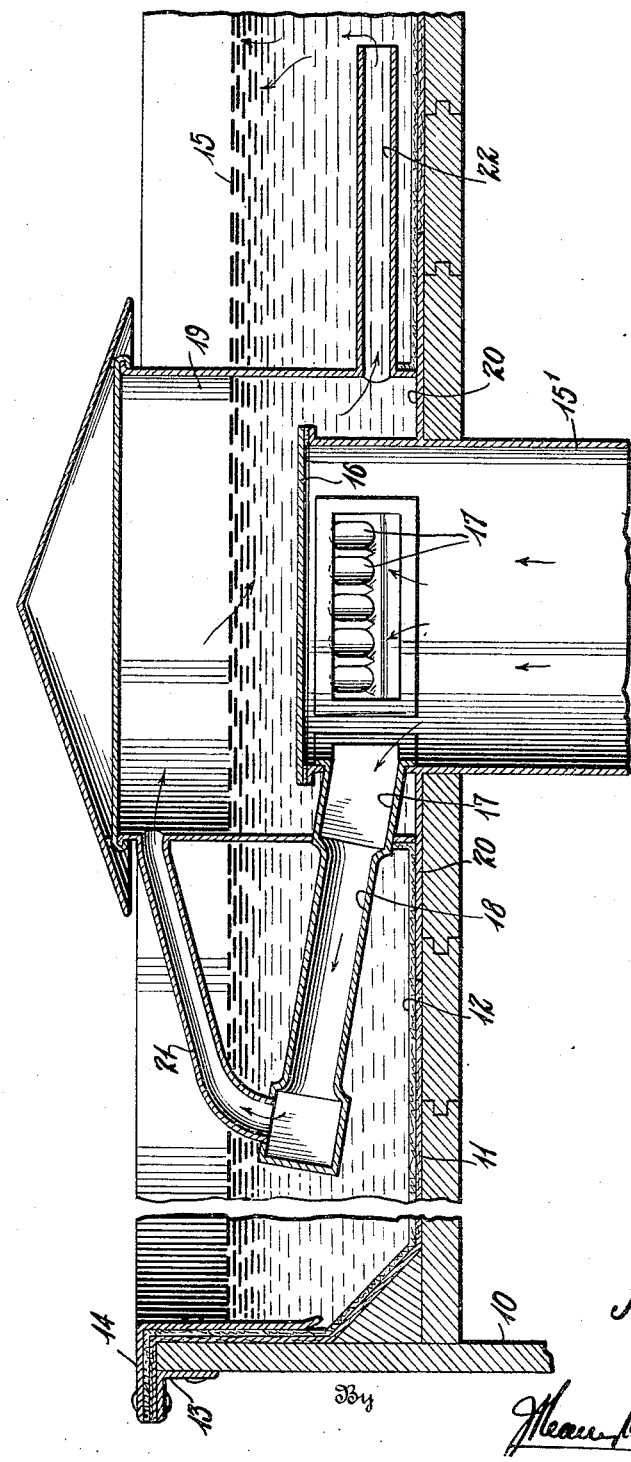
Figure 2 is a sectional view of an improved tank structure with the invention applied thereto.

In the storage of crude oil it is necessary to apply heat thereto thru steam coils in order to produce an easy flow of the oil and this heat generates gaseous vapors which escape thru an outlet in the tank. Likewise, the heat of the sun on the tank produces the same result, the vapor thus generated rising in the air above and around the top of the tank, creating a gaseous field presenting a constant risk of fire, particularly during electrical storms. Should lightning strike in the neighborhood of these gases they ignite readily and the flame is carried down to the tank which is very susceptible to fire.

It is the purpose of the present invention to provide a safeguard against such a contingency by providing the liquid seal thru which the vapors are forced, prior to escaping to the open air whereby they are condensed, the gasoline condensate being retained in the tank and the vapor passing outwardly of the same.

In applying the invention to a tank of large capacity, the roof of the tank is located about six or eight inches, more or less, below the upper edge of the tank and sheathed solid with matched sheathing or flooring 10 with an upper covering, such as red rosin paper 11, applied to prevent any of the asphalt or other material of the composition roof coming in contact with the sheathing. The roof 12, a composition of felt, asphalt and other material which makes the roof fireproof, is laid over the paper as shown, the whole being extended upwardly along the exposed sides of the tank and connected to angle irons eaves 13. These eaves are fastened to the outside of the tank and are capped with a suitable cap 14 for holding the composition roof in place. The tank is thus made absolutely air tight and water proof and provides a reservoir for the liquid seal 15.

The roof of the tank, which is thus under water, may be provided with as many openings as required for the number of condensers used. The condensers are designed as shown in Figure 1 and comprise an inlet tube 15′ having an air tight cap 16 at its upper end below which are provided separate groups of inlet openings 17 leading into the condensing cylinders 18. Four of such cylinders are preferably provided and arranged radially with respect to tube 15′, the said cylinders projecting outwardly thru the sides of the closed hood 19 which surrounds the upper end of tube 15′, being supported on the flange 20 of the latter. Each condensing cylinder 18 has a restricted tube 21 communicating with the hood at its upper end to conduct thereinto the vapors remaining after the gasoline is condensed in cylinders 18 and drained back into the tank.

As the vapors expand within chamber 19 they are forced, by the pressure generated, under the water or other liquid 15 and escape thru outlet tubes 22, which are under water as shown. The gases bubble up thru the water surrounding the hood on the outside and pass upwardly above the roof of the tank which is thus made fireproof.

The condenser may, however, be used independent of the roof structure, as for instance, on smaller or gasoline storage tanks. For the latter purpose, the condenser is seated in a pan 23 as shown in Figure 3 which may serve as a cover for the gasoline tank or barrel, a suitable supply of water or liquid being contained in the pan to form the seal. Any suitable means may be employed for regulating the water supply so as to maintain the latter at a predetermined depth and, also, for regulating the pressure within the pressure chamber.

It will thus be seen that the construction provided enables crude oil to be readily stored in small or large quantities at a minimum risk of fire and without requiring any elaborate change in the shape or construction of the storage tank itself.

From the foregoing it is thought that the advantages and novel features of the invention can be readily understood and that further detailed description thereof is unnecessary.

What is claimed is:

1. A cover and condenser for storage tanks comprising a pressure chamber having an outlet, a liquid reservoir surrounding the chamber and having a liquid seal in which the outlet of the pressure chamber is submerged, and means communicating with a storage tank and providing a gas passage from the latter to the pressure chamber.

2. A device of the character specified comprising a pressure chamber and means surrounding the chamber to provide a liquid seal for the outlet therefrom, condensers submerged within the seal-forming means and providing an outlet for the gases of the storage tank.

3. A cover for storage tanks including, in combination, a tank having a roof positioned below the upper edge of the tank to provide a water reservoir for a liquid seal, a fireproof covering for the said roof comprising an under layer of rosin paper and a top layer of composition material including felt and asphalt, said covering being extended above the roof to provide a lining for the reservoir, and gas condensing means including a tube protruding upwardly thru the roof of the tank and having a closed upper end, a closed hood surmounting the said upper end of the tube and resting on the roof in circumferentially spaced relation to the tube to provide a vapor chamber therebetween, a series of condensing cylinders, arranged to be submerged in the liquid of the seal, connecting pipes between the said condensing cylinders and the upper end of the said tube, vapor outlet pipes connecting the said condenser cylinders with the upper end of the said hood and discharging into the vapor chamber of the latter, said hood having submerged outlets.

In testimony whereof I affix my signature.

JOHN RICHARD HILL.